No. 745,843.

Patented December 1, 1903.

UNITED STATES PATENT OFFICE.

CARL HERMANN VON HOESSLE, OF RADEBEUL, NEAR DRESDEN, GERMANY, ASSIGNOR TO CHEMISCHE FABRIK VON HEYDEN ACTIENGESELLSCHAFT, OF RADEBEUL, NEAR DRESDEN, GERMANY.

CHROMATE OF SILVER.

SPECIFICATION forming part of Letters Patent No. 745,843, dated December 1, 1903.

Application filed June 9, 1903. Serial No. 160,741. (Specimens.)

*To all whom it may concern:*

Be it known that I, CARL HERMANN VON HOESSLE, a subject of the King of Saxony, and a resident of Radebeul, near Dresden, in the Kingdom of Saxony, in the German Empire, have invented a new and useful Improvement in Chromates of Silver, of which the following is a specification.

My invention consists in a new salt of silver, which may be termed "colloidal chromate of silver" and which may be used in medicine in all cases in which preparations of silver and chromium are used.

In the manufacture of this salt I proceed as follows: Forty parts of albumose, albumen of eggs, or gelatin are dissolved in one thousand parts of water, twenty parts of bichromate of potash in five hundred parts of water are added, and in this solution a solution of twenty parts of nitrate of silver with five hundred parts of water is stirred. By the addition of alkali a dark-colored solution of the colloidal chromate of silver is obtained, from which the colloidal chromate of silver ($Ag_2CrO_4$) may be precipitated on addition of alcohol and filtered and dried at low temperature. This precipitation may also be effected by the addition of acid instead of alcohol; but in this case the well-washed precipitate must be dissolved once more with water on addition of a small quantity of alkali, preferably caustic soda, and the solution must be dried and pulverized. The colloidal chromate of silver forms a very dark-colored powder sensitive to light, of neutral reaction, insoluble in alcohol and ether, soluble in water, forming a dark-colored fluorescent solution. This method of manufacture may be modified in various ways by the employment of other proportions, by the use of other chromates instead of bichromate of potash, and by the use of other substances of the albumen group or of the splitting-off products and other derivatives of the albumen.

Before precipitating the colloidal chromate of silver the raw solution may also be purified by means of dialysis and then dried or precipitated with alcohol or acid, as described above.

Having thus described my invention, what I claim as new, and desire to secure by Letters Patent, is—

The product herein described, colloidal chromate of silver, being a dark-colored powder of neutral reaction, insoluble in alcohol and ether, soluble in water forming a dark-colored fluorescent solution, containing the chromate of silver, ($Ag_2CrO_4$,) in soluble form.

In witness whereof I have hereunto set my hand in presence of two witnesses.

CARL HERMANN VON HOESSLE.

Witnesses:
GEORG RICHTER,
GEORG HEUSSINGER.